March 26, 1968  J. L. MASON  3,375,359

ANALOG MULTIPLIER

Filed Aug. 24, 1964

INVENTOR.
JOHN L. MASON
BY
ATTORNEY

3,375,359
ANALOG MULTIPLIER

John L. Mason, Nashua, N.H., assignor to Sanders Associates, Inc., Nashua, N.H., a corporation of Delaware
Filed Aug. 24, 1964, Ser. No. 391,651
3 Claims. (Cl. 235—194)

ABSTRACT OF THE DISCLOSURE

The present invention is directed to an electrical analog multiplier for producing an output signal equal to the product of two input signals; one of said signals being applied to a non-mechanical transducer whose output is applied to both a linearizing circuit and to a second signal path, whereby the second signal is applied to the second signal path and the output of the transducer affects the second signal path in accordance with magnitude of the first input signal, to thereby provide an output at the second signal path which is equal to the product of said first and second signals.

---

The multiplier has a considerable accuracy over a wide range of input signal levels. In a preferred embodiment, the transducer has a radiant energy source, such as a lamp, illuminating a detector such as a photocell.

Prior art analog multipliers incorporating mechanical servomechanisms have limited reliability and they are necessarily characterized by relatively slow operation. Moreover, providing accuracy with such mechanical multipliers generally involves considerable expense.

The prior all-electric multipliers are likewise relatively costly in addition to being fairly complex.

Accordingly, it is an object of the present invention to provide an improved analog multiplier.

A further object is to provide an accurate multiplier of the above type characterized by simple operation and having a simple and compact construction.

Another object of the invention is to provide relatively low cost electrical analog multiplier having no moving parts and characterized by relatively high accuracy.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 1:
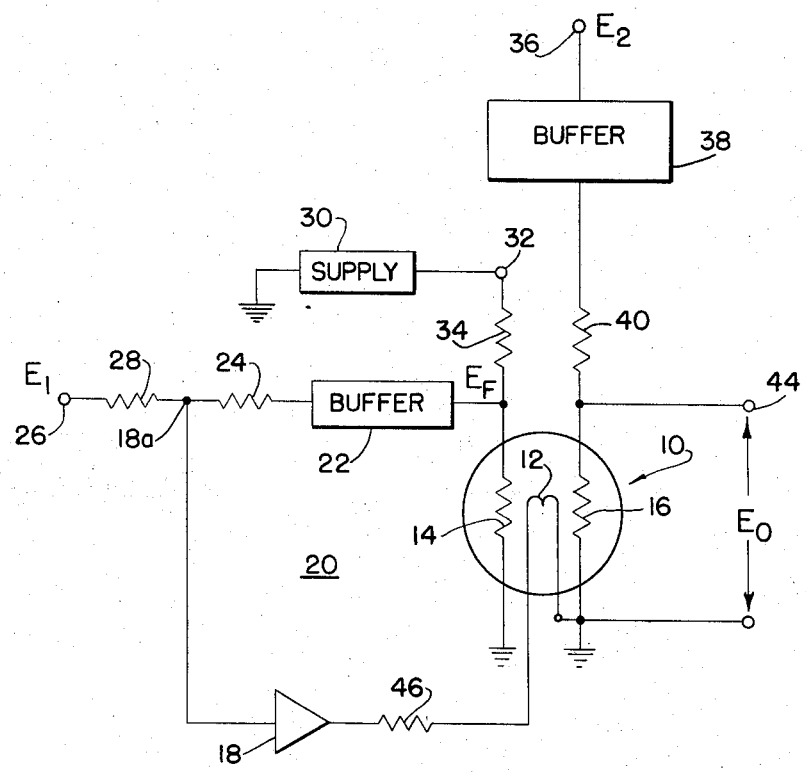
Figure 2:
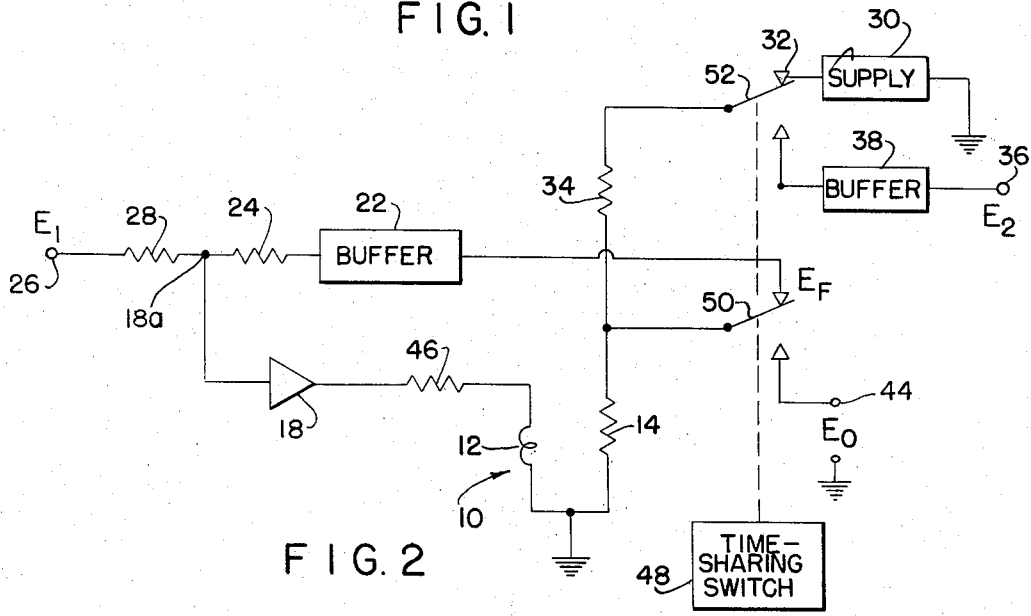

For a fuller understanding of the nature and objects of the invention, reference should be had to the following detailed description taken in connection with the accompanying drawings, in which:

FIG. 1 is a schematic representation, partly in block form, of a multiplier circuit embodying the invention; and FIG. 2 is a schematic representation, partly in block form, of another multiplier embodying the invention.

In general, one input signal to the multiplier is applied to a feedback loop comprising a source of radiant energy, e.g. a light bulb, that illuminates a variable-impedance detector of the energy. The detector provides an intermediate signal which, by means of the feedback arrangement, is linearly related to the first input signal. With this arrangement, the radiation from the source accurately corresponds to the amplitude of the first input signal and so also does the impedance of the detector.

An output circuit in the multiplier also has a detector that receives energy from the radiation source. As a result, the illumination and hence the electrical impedance of the detector in the output circuit also accurately correspond to the first input signal.

The output circuit also receives the second input signal. The circuit is arranged so that this signal combines with the impedance of the output circuit detector to develop an output signal whose amplitude corresponds to the product of the magnitude of the two input signals.

The novel multiplier is particularly suited for construction with components having high reliability and minimal power dissipation. For example, in the preferred embodiment all the components, including the radiant energy source, can be solid state devices. This enables the multiplier to have low cost and small size, as well as high reliability and high speed of operation.

More specifically, the multiplier of FIG. 1 has a transducer, indicated generally at 10, in the form of a light source 12 illuminating two photocells represented as resistors 14 and 16. The photocell 14 and the light source 12 are arranged with an amplifier 18 in a feedback loop indicated generally at 20. A buffer amplifier 22 and resistor 24 are successively arranged in series between the photocell 14 and the input terminal 18a of the amplifier 18. A first of the signals to be multiplied is applied to the loop 20 at a terminal 26 and through a resistor 28.

The photocells 14 and 16 are preferably semi-conductor photoresistors, whose resistances decrease with an increase in applied radiation.

As also shown in FIG. 1, a supply 30 develops a reference voltage $E_{ref}$ at a terminal 32 for application across the series combination of a resistor 34 and the photocell 14.

The other input signal to be multiplied is applied at an input terminal 36 connected through a buffer 38 and a resistor 40 to the other photocell 16. The output voltage from the multiplier is taken from across the second photocell 16 i.e. between a terminal 44 and ground.

Considering the operation of the multiplier of FIG. 1 in general terms, at the input to the buffer amplifier 22, the reference voltage from the supply 30 develops a feedback voltage $E_F$ whose value varies with the resistance, and hence the illumination, of the photocell 14. The feedback signal is applied to the input terminal 18a of the amplifier 18 together with the input signal at the terminal 26. The two signals have opposite polarity and hence a voltage proportional to their difference is applied to the amplifier 18. In response, the amplifier excites the light source 12, changing the resistance of the photocell 14, and correspondingly reducing the feedback voltage $E_F$ to a small value.

When, for example, the input voltage $E_1$ increases, the change in the instantaneous difference voltage at the terminal 18a causes the amplifier 18 to apply less excitation to the light source 12. This reduces the illumination on the photocell 14, whereby its resistance increases. Thus, the feedback voltage $E_F$ increases, thereby diminishing the difference voltage input to the amplifier 18. The light source excitation from the amplifier 18 continues to decrease until the feedback voltage rises sufficiently to provide a balance in the circuit, with the amplifier 18 input voltage again at a small value, though somewhat different from its previous level. In reality, this operation takes place substantially instantaneously.

The diminished radiation from the light source 12 that increased the resistance of the photocell 14 in response to the increased input voltage $E_1$ also increases the resistance of the photocell 16 correspondingly. Thus, the resistance of the photocell 16 corresponds to the input voltage $E_1$. The output voltage $E_0$ across the photocell 16 is a function of the resistance of the photocell, multiplied by the input voltage $E_2$. Therefore, this voltage is proportional to the product of the input voltages $E_1$ and $E_2$.

The buffer 22 shown in FIG. 1 isolates the resistor 24 from the photocell 14 and, in effect, prevents current from the supply 30 from being drawn into the resistor 24 and the source of the input voltage $E_1$. The buffer 38 provides a known constant source resistance to the voltage divider comprising resistor 40 and photocell 16. The buffers 22 and 38 are appropriately conventional amplifiers having relatively low output impedances and high input impedances. The buffer 22 may be part of the summing circuit formed by the resistors 28 and 24.

The amplifier 18 may be a conventional solid state operational amplifier of the type common in the servo mechanism and analog computing art. A resistor 46 is in series between the amplifier 18 and the light source 12 to limit the output from the amplifier. Depending on the amplifier construction, the resistor 46 may represent the output impedance of the amplifier.

Turning now to the details of the transducer 10, the photocells 14 and 16 are preferably formed from a single piece of photoconductive material such as cadmium selenide cut into two equal pieces. Also, the photocells are desirably arranged to receive equal illumination from the light source 12 so that their resistances will be equal. A commercially available dual photoconductive cadmium selenide cell suitable for the photocells 14 and 16 is manufactured by the Clairex Corporation under the designation of CL703L/2.

The operation of the multiplier will be further comprehended from the following analysis.

The resistance of each of the resistors and of the photocells is designated in the following equations by the letter R followed by a subscript numeral that is the reference numeral of the component. Thus, for example, $R_{14}$ is the resistance of the photocell 14. Applying Ohm's law to the series circuit comprising supply 30, resistor 34 and the photocell 14, $$E_F = \left[\frac{R_{14}}{R_{14}+R_{34}}\right] E_{Ref} \quad (1)$$

When the gain of the amplifier 18 is large, as desired for preferred operation, the difference voltage at the terminal 18a is close to zero. Therefore, the magnitudes of the input signal $E_1$ and of the feedback signal $E_F$ correspond substantially as follows:

$$E_F = \left[\frac{R_{24}}{R_{28}}\right] E_1 \quad (2)$$

where $R_{24}$ and $R_{28}$ include the output resistance of the buffer 22 and the resistance of the source of $E_1$, respectively.

Combining Equations 1 and 2 provides the following relationship:

$$E_1\left[\frac{R_{24}}{R_{28}}\right] = E_{Ref}\left[\frac{R_{14}}{R_{14}+R_{34}}\right] \quad (3)$$

Considering the output circuit comprising the buffer 38, resistor 40 and the photocell 16, and assuming that essentially no current is drawn from the output terminal 44, the magnitude of the output voltage $E_0$ can be expressed as $$E_0 = \left[\frac{R_{16}}{R_{16}+R_{40}}\right] E_2 \quad (4)$$

As discussed above, the photocells 14 and 16 are illuminated by the same light source 12. Therefore, their resistances are linearly related by a scale factor $k$.

$$R_{14} = kR_{16} \quad (5)$$

With the linear relationship shown by Equation 5, the values of the resistances $R_{34}$ and $R_{40}$ can be selected to provide the following characteristic for all values of $R_{14}$ in the range of operation of the multiplier:

$$\frac{R_{14}}{R_{14}+R_{34}} = \frac{R_{16}}{R_{16}+R_{40}} \quad (6)$$

Substituting from Equation 6 into Equation 3, $$E_1\left[\frac{R_{24}}{R_{28}}\right] = E_{Ref}\left[\frac{R_{16}}{R_{16}+R_{40}}\right] \quad (7)$$

Finally, substituting from Equation 7 into Equation 4, $$E_0 = [E_1][E_2]\left[\frac{R_{24}}{R_{28}E_{Ref}}\right] \quad (8)$$

The last term of Equation 8 is a constant and, if desired, can be made equal to unity so that $$E_0 = E_1 E_2 \quad (9)$$

It is thus seen that the magnitude of the output voltage $E_0$ is indeed equal to the product of the magnitudes of the input voltages $E_1$ and $E_2$.

The multiplier can provide the above operation for a range of the first input voltages $E_1$ that covers three decades, and for values of the voltage $E_2$ between approximately zero and 100 volts.

However, full accuracy is not available with small values of $E_1$. Such an input voltage at the terminal 26 in FIG. 1 requires that the feedback voltage $E_F$ be small, which, in turn, requires that the photocell 14 have a small resistance. The residual minimum resistance has a value that is not negligible when compared with the value corresponding to an extremely low input voltage $E_1$. Therefore, the required relationship between the input voltage and $R_{14}$ is not maintained for small values of $E_1$.

Correspondingly, the accuracy of the multiplier is somewhat degraded with very large values of the input voltage $E_1$. This is due to the finite upper limit of the resistance of the photocell 16 which prevents the output voltage $E_0$ at terminal 44 from approaching closely to the voltage $E_2$.

The upper frequency limit of the input signals which the multiplier can follow is determined primarily by the response times of the light source 12 and of the photocells 14 and 16. With a standard incandescent resistance lamp such as a "grain of wheat" lamp, this frequency is of the order of 50 cycles per second. With a neon or other vapor lamp, the frequency limit is in the kilocycle range. Using a gallium arsenide laser diode, the frequency response, may be extended well into the megacycle region.

Turning now to FIG. 2, the present multiplier can alternatively be constructed with a single photocell. This arrangement provides greater accuracy than is available with the circuit of FIG. 1. However, the frequency response or band width of the single photocell arrangement is less than that of the dual photocell arrangement of FIG. 1.

The components of FIG. 2 corresponding to components in the multiplier of FIG. 1 are identified with the same reference numerals as in FIG. 1. A time-sharing switch 48 having two transfer contacts 50 and 52 has the contact 50 arranged to connect the photocell 14 in the feedback loop 20, to which the input voltage $E_1$ is applied at the terminal 26. In this position of the switch 48, the position shown in FIG. 2, the contact 52 connects the supply 30 to the resistor 34 in series with the photocell 14.

When the switch 48 transfers the contacts 50 and 52 to their alternate positions, the photocell 14 is connected to the output terminal 44, with the input voltage $E_2$ at the terminal 36 being applied through the switch contact 52 to the photocell 14.

The light source 12 is selected to have a relatively slow response time so as to function as a memory and retain the previously developed illumination level during the alternate switch position when the photocell 14 is connected with the second input voltage $E_2$ and the output voltage terminal 44.

The time-sharing switch 48 employs a reed switch or, alternatively, conventional all-electronic construction.

In addition to serving as an analog multiplier in the manner described above, the circuit of the invention can be used as a low frequency amplitude modulator. For this application, the carrier signal is applied to one input and the modulating signal is applied to the other input of the multiplier. The output signal is then the modulation product of these input signals.

In summary, the novel multiplier described above employs a transducer having no moving parts. The multiplier has relatively high accuracy and frequency response. Moreover, it is simple in construction, requiring relatively few components, so that it can be manufactured at low cost and with small size.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In electrical apparatus for producing an output signal with a level proportional to the product of the levels of first and second input signals, the combination comprising
    (A) an energy detector,
    (B) means irradiating said detector in response to a comparative function of a feedback signal and said first input signal,
    (C) means for developing in said detector a current corresponding to the level of said second signal, and
    (D) time-sharing switch means alternately connecting said detector
        (1) in a feedback circuit where it develops said feedback signal according to the radiant energy incident on it, and
        (2) in circuit with said current developing means.

2. An electrical multiplier for producing an output voltage whose magnitude corresponds to the product of the magnitudes of first and second input voltages, said multiplier comprising in combination
    (A) double-pole double-throw time-sharing switch means
        (1) having first, second, third, fourth, fifth and sixth terminals,
        (2) said switch being operable to
            (a) couple said first terminal alternately to said second and third terminals, and
            (b) synchronously couple said fourth terminal alternately to said fifth and sixth terminals,
    (B) a transducer comprising
        (1) a photoconductive resistor connected between said first terminal and
        (2) a light source illuminating said photoconductive resistor,
    (C) a second resistance element connected between said first terminal and said fourth terminal,
    (D) third and fourth resistance elements arranged in series with each other at a common connection, said third element being connected with said second terminal,
    (E) a light source exciting operational amplifier connected between said common connection and said light source, and receiving as an input signal the signal at said common connection,
    (F) a reference voltage supply connected to said fifth terminal,
    (G) a first input terminal connected to said fourth resistance element,
    (H) a second input terminal connected to said sixth terminal, and
    (I) an output terminal connected to said third terminal.

3. The electrical multiplier defined in claim 2 further comprising
    (A) a buffer circuit connected between said third resistance element and said second terminal, and
    (B) a further buffer circuit connected between said second input terminal and said sixth terminal.

References Cited
UNITED STATES PATENTS

| | | | |
|---|---|---|---|
| 3,058,662 | 10/1962 | Whitesell | 235—194 |
| 3,070,306 | 12/1962 | Du Bois | 235—194 X |
| 3,082,381 | 3/1963 | Morill et al. | |
| 3,167,647 | 1/1965 | Newbold | 235—194 X |
| 3,193,672 | 7/1965 | Azgapetian | 235—194 |
| 3,211,900 | 10/1965 | Bray | 235—194 |
| 3,238,135 | 11/1966 | Sklaroff | 235—194 |

OTHER REFERENCES

IBM Technical Disclosure Bulletin, "Analog Multiplication and Division Circuit," vol. 3, No. 10, March 1961, pp. 136, 137.

Korn and Korn, "Electronic Analog Computers," McGraw-Hill, New York, 1956, page 172.

MALCOLM A. MORRISON, *Primary Examiner.*

T. J. PAINTER, *Assistant Examiner.*